United States Patent [19]

Heininger, Jr. et al.

[11] Patent Number: 4,516,324

[45] Date of Patent: May 14, 1985

[54] MODULAR HOUSING SYSTEM FOR A CIRCULAR SAW

[75] Inventors: Ammon N. Heininger, Jr., Redlion, Pa.; Edward A. Barnik, Reisterstown, Md.

[73] Assignee: Black & Decker Inc., Newark, Del.

[21] Appl. No.: 438,522

[22] Filed: Nov. 1, 1982 (Under 37 CFR 1.47)

[51] Int. Cl.³ .......................... B23D 47/02; B27B 9/02

[52] U.S. Cl. .......................................... 30/377; 30/391

[58] Field of Search .................................. 30/374–377, 30/388, 390, 391; 83/546, 574, 743, 829, 860

[56] References Cited

U.S. PATENT DOCUMENTS

| | | | |
|---|---|---|---|
| 1,457,492 | 6/1923 | Bloodgood | 83/574 X |
| 1,764,111 | 6/1930 | Manthey | 30/377 |
| 2,671,476 | 3/1954 | Richards et al. | 30/391 |
| 2,993,518 | 7/1961 | Bork | 30/391 |
| 3,245,439 | 4/1966 | Sheps et al. | 30/390 |
| 3,733,701 | 5/1973 | Lubas | 30/391 |

*Primary Examiner*—Douglas D. Watts

*Attorney, Agent, or Firm*—R. B. Sherer; Edward D. Murphy; Harold Weinstein

[57] ABSTRACT

A portable circular saw includes a single, one-piece thermoplastic housing having an interface portion which interchangeably mounts either a pivot adjust or vertical adjust subassembly, whereby two types of saws may be constructed using the same field case. One type adjusts saw blade depth of cut by pivotal movement of the housing relative to a reference plane. The other type adjusts saw blade depth of cut by transverse movement of the housing relative to the reference plane. The pivot adjust subassembly includes a one-piece foamed plastic auxiliary handle having an integral handgrip portion, pivot and lower guard bumper. The vertical adjust subassembly includes a one-piece rectangular rail member having an outer perimeter edge surface which guides the movement of a vertical adjust bracket. The pivot handle and the one-piece rail member, respectively, are interchangeably and snugly mounted on a common locating surface formed in the field case interface portion.

6 Claims, 19 Drawing Figures

FIG. 5
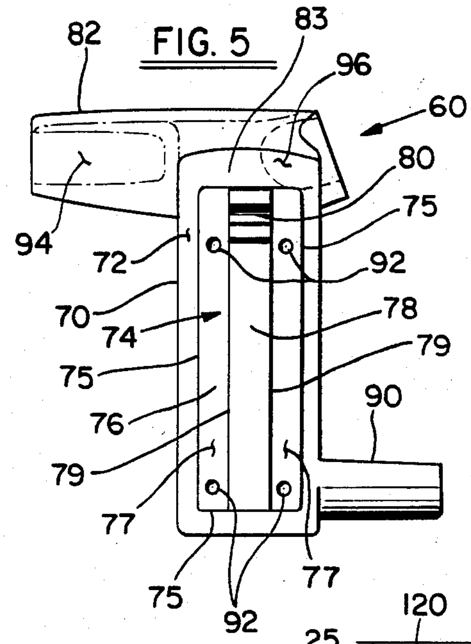
FIG. 6
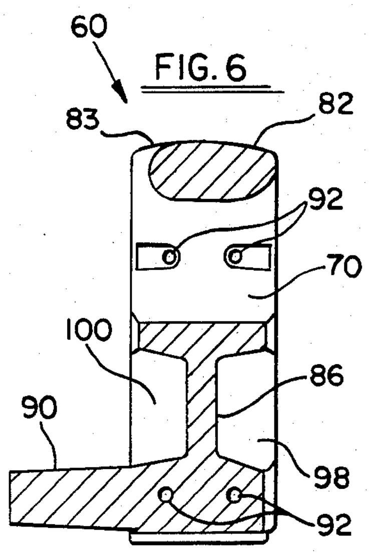
FIG. 8
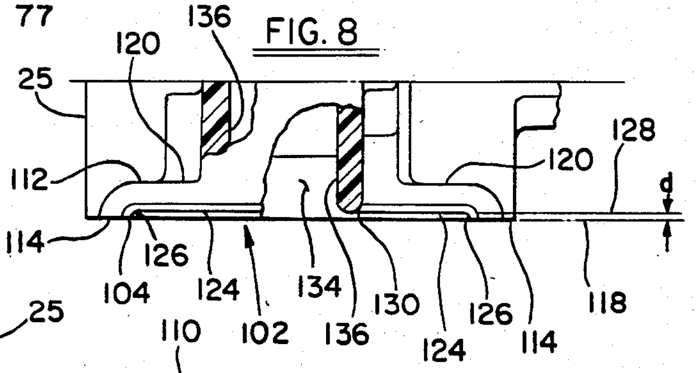
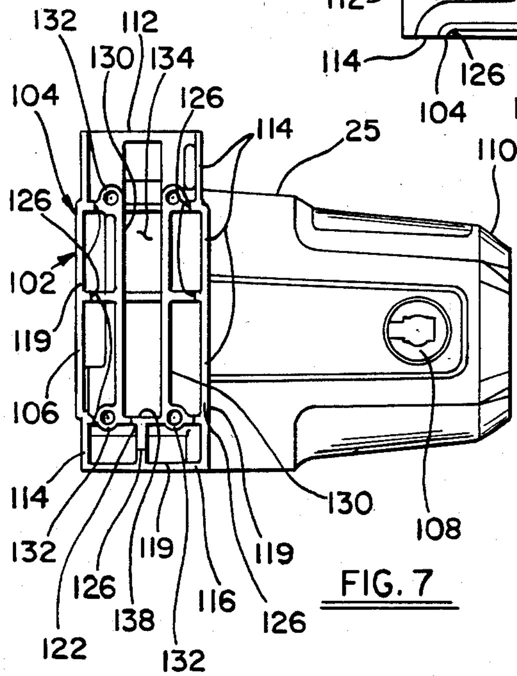
FIG. 7

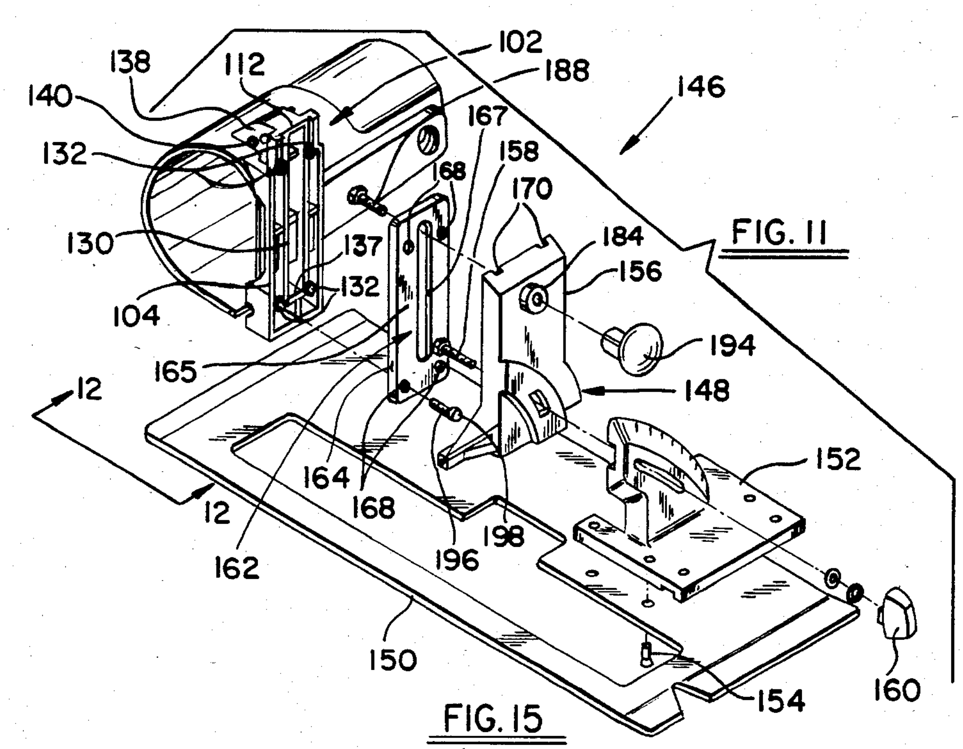
FIG. 11
FIG. 15
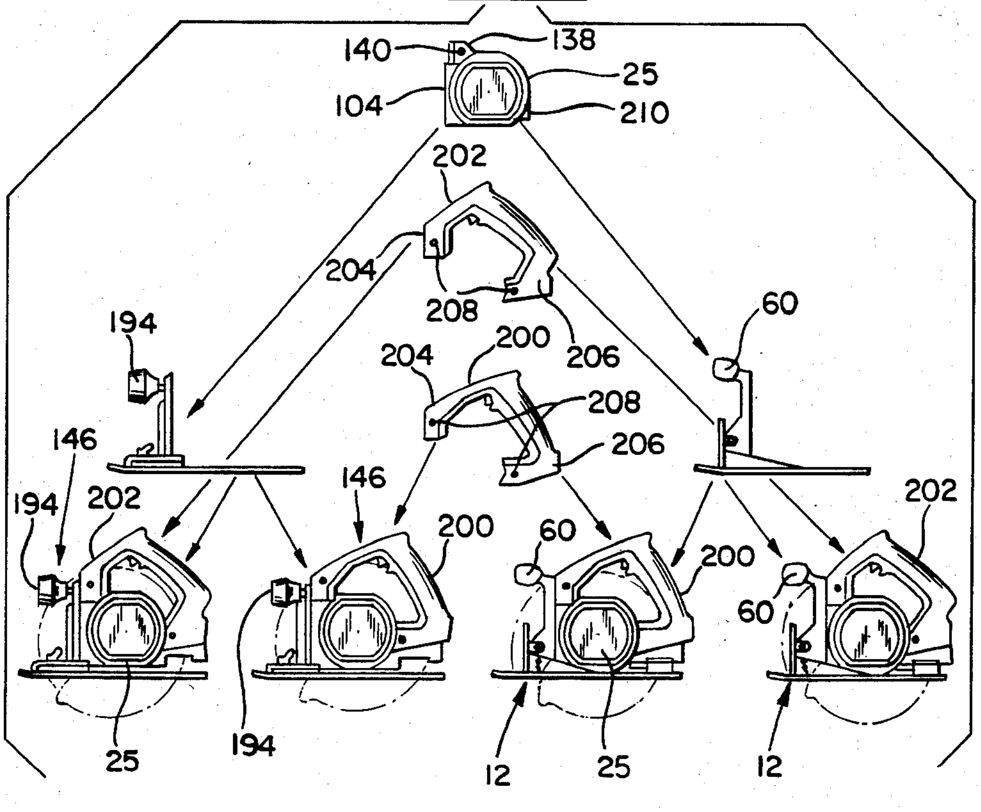

MODULAR HOUSING SYSTEM FOR A CIRCULAR SAW

BACKGROUND OF THE INVENTION

1. Field of the Invention

This invention relates to circular saws, and more particularly to a modular housing system for a circular saw. Either a pivot adjust subassembly or a vertical adjust subassembly may be connected to the modular housing so that the saw blade depth of cut may be adjusted either by pivotal or by transverse movement, respectively, of the housing relative to a reference plane. When the saw is operated as a vertical adjust saw, a one-piece rail member and sliding bracket coact to provide more accurate positioning of the housing with respect to the reference plane.

2. Description of the Prior Art

Previous circular saws having the facility for adjusting depth of cut of saw blades have been of two major types: those which adjust depth of cut by moving the saw housing transversely with respect to a saw shoe which contacts the workpiece (vertical adjust saws), or those which adjust depth of cut by pivoting the saw housing with respect to a saw shoe (pivot adjust saws). Each type has its own advantages but each requires a different housing. None uses a single housing configuration which enables the saw to be assembled either as a pivot adjust type or as a vertical adjust type.

Saws of the pivot adjust type are illustrated in U.S. Pat. No. 3,456,696, and U.S. Design Pat. No. 262,184. Each of the two circular saws requires a housing particularly constructed for pivot adjust operation.

Saws of the vertical adjust type are illustrated in U.S. Pat. Nos. 1,848,330, 2,993,518, and 3,292,673. Each shows a housing having vertically-extending slots which accommodate only a vertical adjust subassembly.

In addition, vertical adjust saws are known which employ a pair of rail members attached to a housing by means of countersunk flat-head screws. This arrangement is required to permit an adjusting bracket to ride on the widest portions of the rail member. Consequently, when the flat-head screws are tightened into the housing the probability increases that the screws may cause the rail members to become skewed with respect to the adjusting bracket, thereby resulting in less accurate cuts.

SUMMARY OF THE INVENTION

A portable circular saw includes a motor housing or field case having an interface portion which interchangebly mounts either pivot adjust or vertical adjust means, whereby two types of saws may be constructed using the same field case. As a result the depth of cut of the saw blade may be adjusted either by pivotal or transverse movement, respectively, of the housing relative to a reference plane.

It is an object of the present invention to provide a modular housing system for a portable circular saw which overcomes the prior art disadvantages, which is simple, economical, reliable, and enhances opportunities for automated assembly; which includes a circular saw blade rotatably connected to a motor in the housing; which extends a predetermined distance from a reference plane to deliver a predetermined depth of cut; which housing includes mounting means on the housing for interchangeably mounting either vertical adjust means for adjusting the depth of cut by transverse movement of the housing relative to the reference plane, or pivot adjust means for varying the depth of cut by pivotal movement of the housing relative to the reference plane; which mounting means include an interface portion formed in the housing; which defines an exterior surface lying in a first plane and having at least two outer perimeter edges and which further defines a locating surface formed wholly within the outer perimeter edges; which locating surface includes first and second interior mounting surfaces; which first interior mounting surface lies in a second plane, and which second interior mounting surface intersects the first and second planes in a generally U-shaped pattern; which vertical adjust means includes a bracket slideably mounted on a one-piece rail member connected to the interface portion; which one-piece rail member has a generally rectangular configuration and defines an aperture in registration with a recess formed in the first interior mounting surface; which rail member engages the locating surface and includes an outer perimeter edge surface; which slideably guides the vertical adjust bracket; which defines a clearance aperture for head portions of a plurality of fasteners connecting the rail member to the interface, whereby the vertical adjust bracket is freely moveable over the fastener head portions; which pivot adjust means includes an auxiliary housing member pivotally connected to a saw shoe which defines the reference plane; which auxiliary housing member includes an appendage received in the recess when the auxiliary housing member is mounted on the locating surface; which appendage has a side surface engaging a side wall defined by the recess.

Other objects and advantages will be apparent from the following description of one embodiment of the invention; the novel features will be particularly pointed out hereinafter in the claims.

BRIEF DESCRIPTION OF THE DRAWINGS

The invention is illustrated in the accompanying drawings in which:

FIG. 5 is a rear elevational detail view of the auxiliary housing member of FIG. 4.

FIG. 6 is an elevational sectional detail view of the auxiliary housing member taken along line 6—6 FIG. 4.

FIG. 7 is a front elevational sectional detail view of the modular housing of the circular saw, showing the interface portion of the present invention.

FIG. 8 is an enlarged top plan detail view, partially cut away and partially in section, of the modular housing of the circular saw, further illustrating the interface portion of the present invention.

FIG. 11 is an exploded perspective detail view of a vertical adjust subassembly in relation to the interface portion of the present invention.

FIG. 15 is a schematic flow diagram illustrating the modularity of the present invention generated by a single housing, two types of switch handles, and two types of depth adjustment subassemblies.

DESCRIPTION OF THE PREFERRED EMBODIMENT

Figure 1:
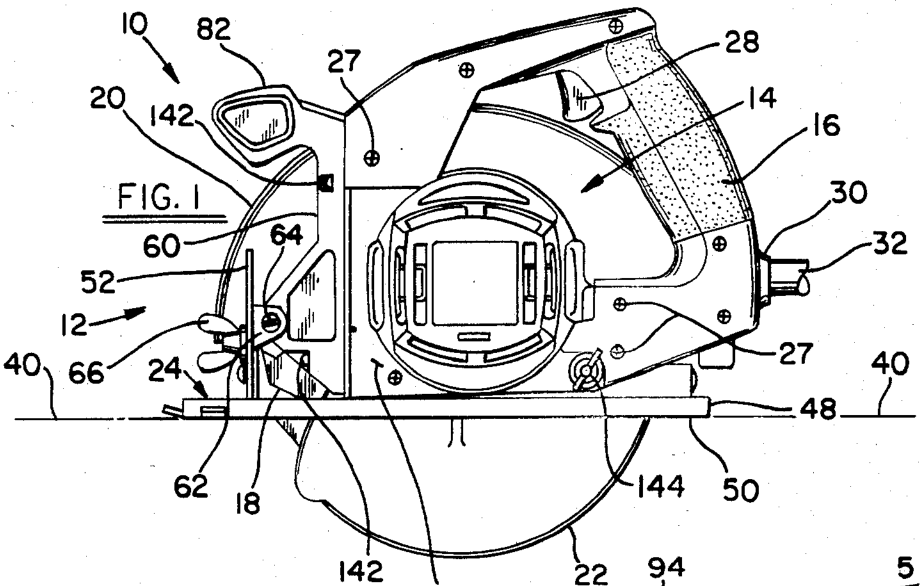
FIG. 1 is a left side elevational view of a pivot adjust circular saw embodying the present invention.
Figure 2:
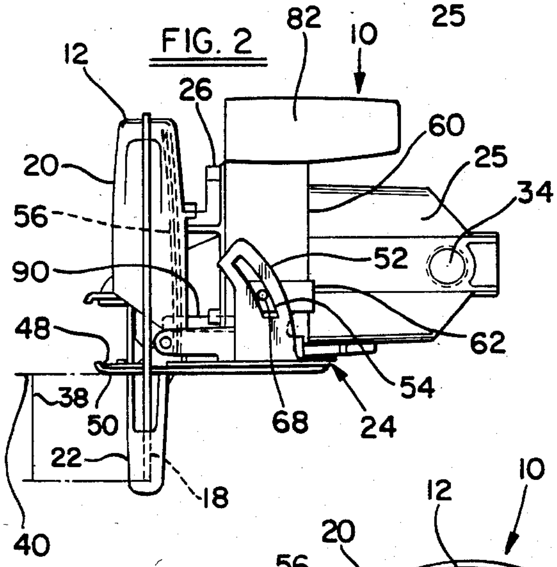
FIG. 2 is a front elevational view of the pivot adjust circular saw embodying the present invention, with elements removed for clarity.
Figure 3:
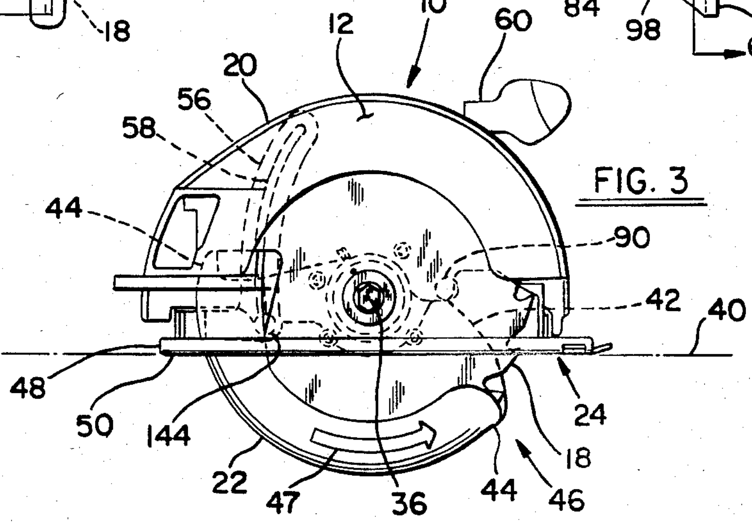
FIG. 3 is a right side elevational view of the saw of FIG. 1, with elements removed for clarity.

Referring to FIGS. 1, 2 and 3, a portable circular saw is shown embodying the present invention, and is referred to generally as 10. The particular type shown in FIGS. 1, 2 and 3 is a pivot adjust saw 12, which includes a housing assembly 14 supporting a main handle 16, a circular saw blade 18, an upper guard 20, a movable or lower guard 22, and a pivot adjust means or subassembly 24. The housing assembly 14 includes a one-piece molded thermoplastic motor housing or field case 25 connected to a gear case 26.

Now referring to FIG. 1, the main handle 16 is attached to field case 25 by main handle fasteners 27, and contains an on-off switch 28. Also mounted in main handle 16 is a strain relief 30 for power cord 32. The on-off switch 28 is connected between power cord 32 and an electric motor (not shown) mounted in field case 25, to which a pair of brush caps 34 are removably secured. Referring to FIGS. 2 and 3, blade 18 is drivingly connected to the electric motor through a suitable drive system (not shown) in gear case 26 by a blade clamp screw 36. The blade 18 delivers a predetermined depth of cut 38 relative to a reference plane 40, (shown in phantom in FIGS. 1, 2, 3, 13, and 14). In the position illustrated in FIGS. 1, 2 and 3 the saw delivers its maximum depth of cut 38 relative to reference plane 40 (which may also be a worksurface.)

In FIGS. 2 and 3, upper guard 20 is shown fixedly attached to the gear case 26; while lower guard 22 is rotatably connected to gear case 26 and is sufficiently narrow to be received within upper guard 20. As shown in FIG. 3, lower guard 22 has a front portion 42 and a rear portion 44. Front portion 42 is shown in FIG. 3 to be in an extended position 46. The lower guard 22 will move clockwise into upper guard 20 in a well-known fashion upon encountering an object, as the saw is moved in the direction shown by arrow 47.

With the preceding description of the different elements of the portable circular saw as background, the modularity of the present invention will now be illustrated by first describing the pivot adjust means, then its coaction with modular mounting means, and lastly, a vertical adjust means and its coaction with the same modular mounting means.

As shown in FIGS. 1, 2, 3, 9, and 13, the pivot adjust subassembly 24 is one example of pivot adjust means for selectively adjusting the depth of cut 38 by pivotal movement of the housing assembly 14 relative to the reference plane 40. The pivot adjust subassembly or means 24 includes these elements: a saw shoe 48 having a work-contacting surface 50, a quadrant 52 defining a bevel angle slot 54, an adjustment strap 56 defining an accurate pivot slot 58 (shown in phantom in FIGS. 2 and 3), an auxiliary housing member or pivot handle 60, and a pivot bracket 62. The quadrant 52 and adjustment strap 56 are both fixedly mounted on the saw shoe 48. The pivot bracket 62 is pivotally attached to the pivot handle 60 by a pivot fastener 64 extending through the pivot handle 60. The quadrant 52 is releasably clamped between a bevel angle lock 66 and the pivot bracket 62, bevel angle lock 66 being connected to the pivot bracket by a fastener stem portion 68 (See FIGS. 2 and 9).

Figure 4:
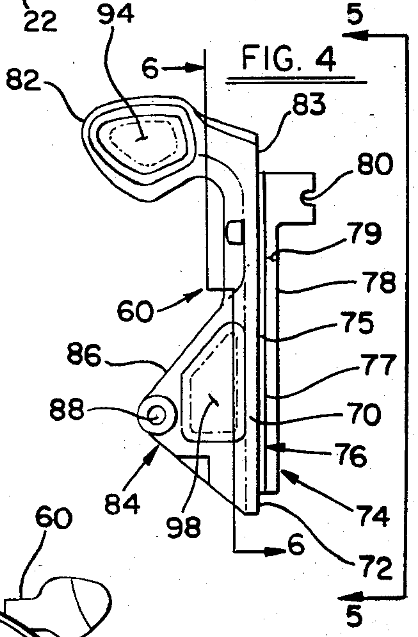
FIG. 4 is a left side elevational detail view of an auxiliary housing member of the circular saw embodying the present invention.

The pivot or auxiliary handle 60 is a one-piece molded plastic member and is a major element of the pivot adjust subassembly 24. Its structure is detailed in FIGS. 4, 5 and 6. Specifically, the pivot handle 60 is molded of foamed polypropylene and includes an elongated base 70 having a generally planar surface 72, upon which are formed integral mounting means 74. The pivot handle mounting means 74 include a generally rectangular raised platform 76 having a peripheral edge 75 and a front surface 77, and supporting an elongated appendage 78, both extending outwardly from the planar surface 72. The appendage 78 has a pair of parallel sidewalls 79 and a fastener clearance portion 80, as shown in FIGS. 4 and 5. In addition to the pivot handle mounting means 74, a handgrip portion 82 is integrally formed adjacent an end 83 of the base 70. A linking or pivot means 84 for pivotally connecting the housing assembly 14 to the saw shoe 48 is also integrally formed on the base 70.

The pivot means 84 includes a triangular support portion 86 defining a bore 88. Both the handgrip portion 82 and the pivot means 84 extend outwardly from base 70 in a direction opposite that of pivot handle mounting means 74. Additionally, as shown in FIGS. 3, 5, and 6, a bumper means 90 for engaging the lower guard 22, and for arresting the lower guard 22 in its extended position 46 is integrally formed with the base 70. Now referring to FIGS. 5, 6, and 9, a plurality of apertures 92 are formed in a predetermined pattern in the pivot handle 60.

As previously indicated the one-piece pivot handle 60 is formed of foamed polypropylene. Because portions of the pivot handle would normally have significant mass relative to the whole structure, it would be subject to depressions or "sinks" in the high-mass portions upon molding. Therefore, as illustrated in FIGS. 4, 5 and 6, the mass in such areas as the handgrip portion 82 and the pivot means 84 has been reduced by molding recesses or cavities into those areas. As seen in FIGS. 4 and 5, left and right handgrip cavities 94, 96 are formed in the handgrip portion 82, thereby defining a relatively thin-walled mass-reduced structure (in phantom in FIG. 5). Similarly, left and right support portion cavities 98, 100 are formed in the pivot means 84, again defining a low-mass structure. The result is a strong, one-piece plastic housing member having a structure which minimizes "sink."

FIGS. 7, 8, 9 and 10 show a unique housing mounting means 102 for mounting the above-described pivot adjust means. Also referring to FIGS. 13 and 14, by providing a single, one-piece thermoplastic field case 25 having the mounting means 102, which interchangeably mounts elements of either the pivot adjust means or a vertical adjust means, the manufacturing costs of the power tool are reduced. The structure of the mounting means 102, which is one of the foundations of modularity of the present invention, will now be described as it coacts with pivot adjust means 24.

Figure 9:
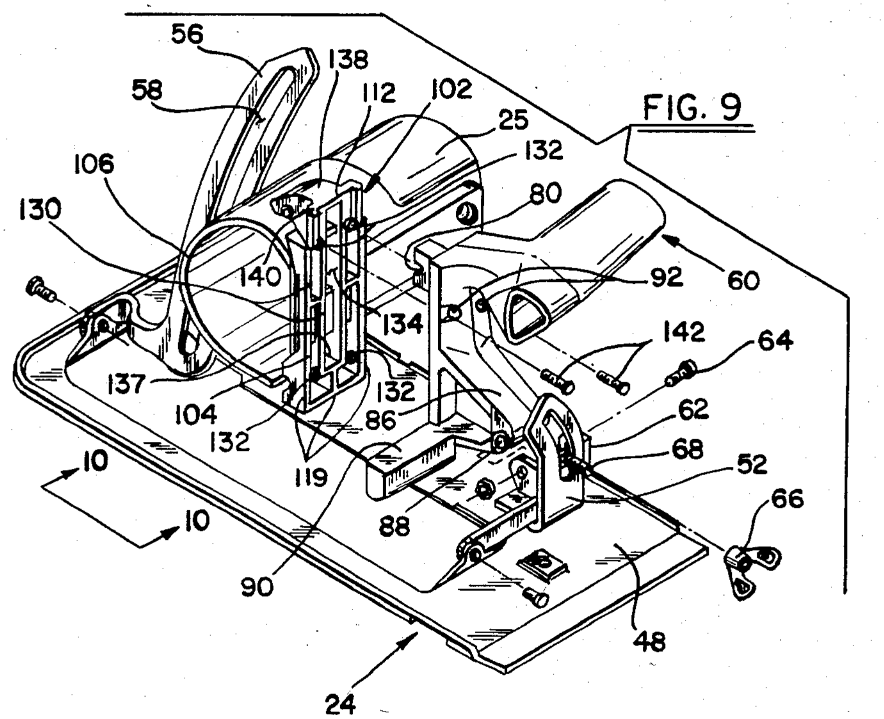
FIG. 9 is an exploded perspective detail view of a pivot adjust subassembly in relation to the interface portion of tne present invention.

Again referring to FIGS. 7, 8, 9, and 10, the mounting means 102 on field case 25 includes an interface portion 104 adjacent an open end 106. The field case 25 also includes a threaded brush aperture 108 formed adjacent a closed end 110. The interface portion 104 is generally rectangular, running approximately the height of the field case 25, and includes a main handle support portion 112. The interface portion 104 further includes an exterior surface 114 which, at the interface front face 116 (facing the viewer in FIG. 7) lies in a first plane 118 (FIG. 8), and is described by outer perimeter edges 119. At the main handle support portion 112, the exterior surface 114 also wraps around the interface portion 104 to form a rear face 120, which engages main handle 16. In addition to the exterior surface 114, the interface portion 104 defines a locating surface 122 formed wholly within the outer perimeter edges 119 and including first and second interior mounting surfaces 124, 126. Still referring to FIG. 8, the first interior mounting surface 124 lies in a second plane 128 parallel to, and inwardly spaced a predetermined distance "d" from, the first plane 118. The second interior mounting surface 126 intersects the first and second planes 118, 128, and, as seen in FIG. 7, describes a generally U-shaped array within the U-shaped outer perimeter edges 119 of the interface portion 104. Referring to FIGS. 7, 8 and 9, the locating surface 122 is defined by a plurality of ribs 130 integrally molded in the field case 25. However it should be understood that the locating surface 122 may also be defined by flat and/or continuous surfaces.

Figure 10:
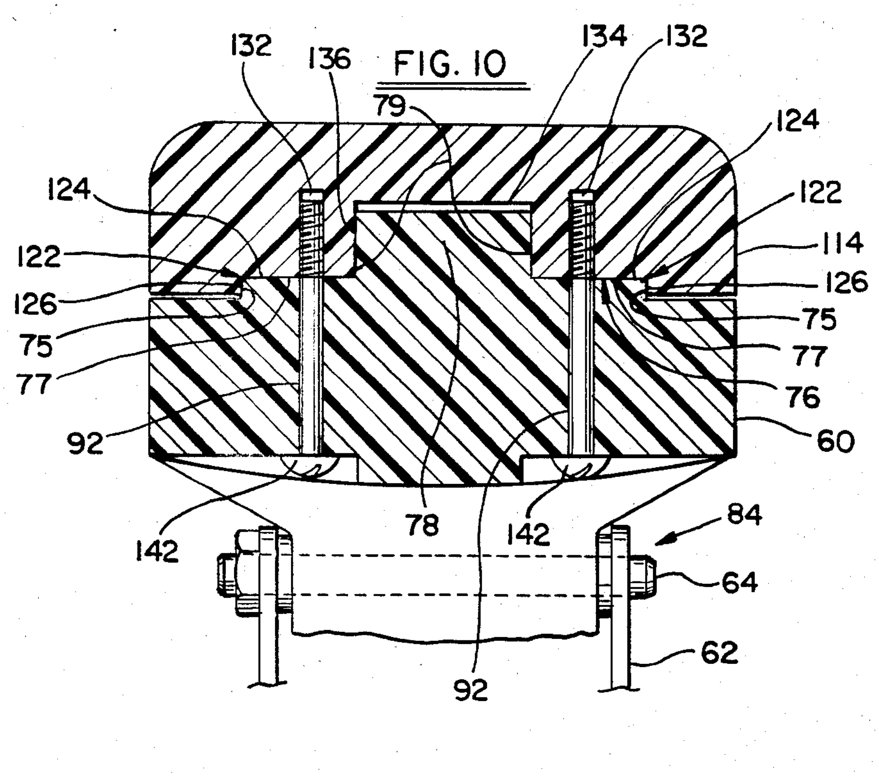
FIG. 10 is an enlarged sectional detail view taken along line 10—10 of FIG. 9.

Referring to FIGS. 7, 9 and 10, a plurality of apertures 132 are formed in the first interior mounting surface 124 in a predetermined pattern, corresponding to that formed by the pivot handle aperture 92, as shown in FIGS. 5 and 6. The interface apertures 132 are located within the U-shaped array described by the second interior mounting surface 126. Now with respect to FIGS. 7, 8, 9, and 10, an elongated rectangular recess 134 is formed inwardly of the second plane 128 and within the predetermined pattern created by the plurality of interface apertures 132. The recess 134 has a pair of parallel opposing side walls 136, which are formed by two of the same ribs 130 used to define the locating surface 122. In addition with respect to FIGS. 7 and 9, a third wall 137 is formed at the base of the recess perpendicular to the side walls 136.

As indicated by FIG. 9, a hollow cupola 138 defining a main handle fastener aperture 140 is connected to the main handle support portion 112 of the interface portion 104.

The assembly of the pivot adjust means 24 to the field case 25 is illustrated in FIGS. 9 and 10. The quadrant 52 and adjustment strap 56 may be connected to the saw shoe 48 by any suitable means, such as by welding or riveting. The pivot bracket 62 and bevel angle lock 66 are connected to the quadrant 52. Now referring to FIGS. 7, 8, 9 and 10, the pivot handle side walls 79 of appendage 78 engage the interface side walls 136 of recess 134. At the same time, the raised platform 76 of the pivot handle 60 is snugly nested within the locating surface 122, such that the pivot handle peripheral edge 75 engages the U-shaped second interior mounting surface 126, and the pivot handle front surface 77 engages the first interior mounting surface 124. Also the fastener clearance portion 80 of appendage 78 is received within cupola 138 so that the main handle fastener aperture 140 is in registration with the fastener clearance portion 80.

A plurality of interface fasteners 142 (FIGS. 1 and 10) are inserted via apertures 92 and 132 to secure the pivot handle 60 to interface portion 104. Now, as shown in FIGS. 1 and 3, the saw shoe 48 is connected to the field case 25 with the adjustment strap 56 being received within upper guard 20. A height adjustment lock 144 is inserted through the field case 25, gear case 26, and upper guard 20, and slideably engages the adjustment strap 56 via its pivot slot 58.

The pivot bracket 62 is pivotally secured to the pivot means 84 by pivot bolt 64, which is inserted in bore 88 of support portion 86. With the pivot adjust means 24 now in place, as illustrated in FIGS. 2 and 3, the pivot handle bumper means 90 engages the guard front portion 42 to arrest its counter-clockwise movement, as viewed in FIG. 3. Thus the integral pivot handle mounting means 74 coacts with the housing assembly 14 to locate the bumper means 90 relative to the lower guard 22 and the pivot means 84 relative to the saw shoe 48.

Figure 13A:
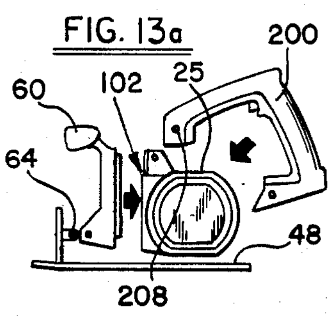
FIGS. 13*a*, 13*b* and 13*c* are schematic diagrams of the assembly and operation processes in which the single field case of the present invention is the foundation of a saw which varies depth of cut by pivotal movement relative to a reference plane.
Figure 13B:
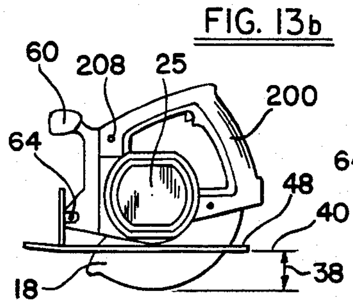
Figure 13C:
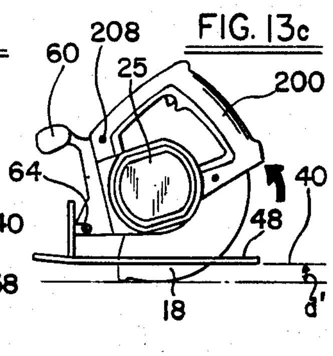

In operation, when it is desired to reduce the depth of cut 38 from that shown in FIGS. 1 and 13*b*, the height adjustment lock 144 is loosened and the housing assembly 14 (and consequently the circular saw blade 18) is pivoted counterclockwise (as shown in FIG. 13*c*) about pivot bolt 64, following the pivot slot 58 in adjustment strap 56. When the desired new depth of cut is reached, the height adjustment lock 144 is tightened against the adjustment strap 56. Thus the sequence of schematic diagrams, FIGS. 13*a*, 13*b* and 13*c*, summarizes the assembly and operating sequence: the field case 25 accepts pivot adjust means 24 via mounting means 102 as shown in FIG. 13*a*. Then the maximum depth of cut 38 of FIG. 13*b* is adjusted to a smaller depth d' (FIG. 13*c*) by pivotal movement of the field case 25 relative to shoe 48.

Figure 12:
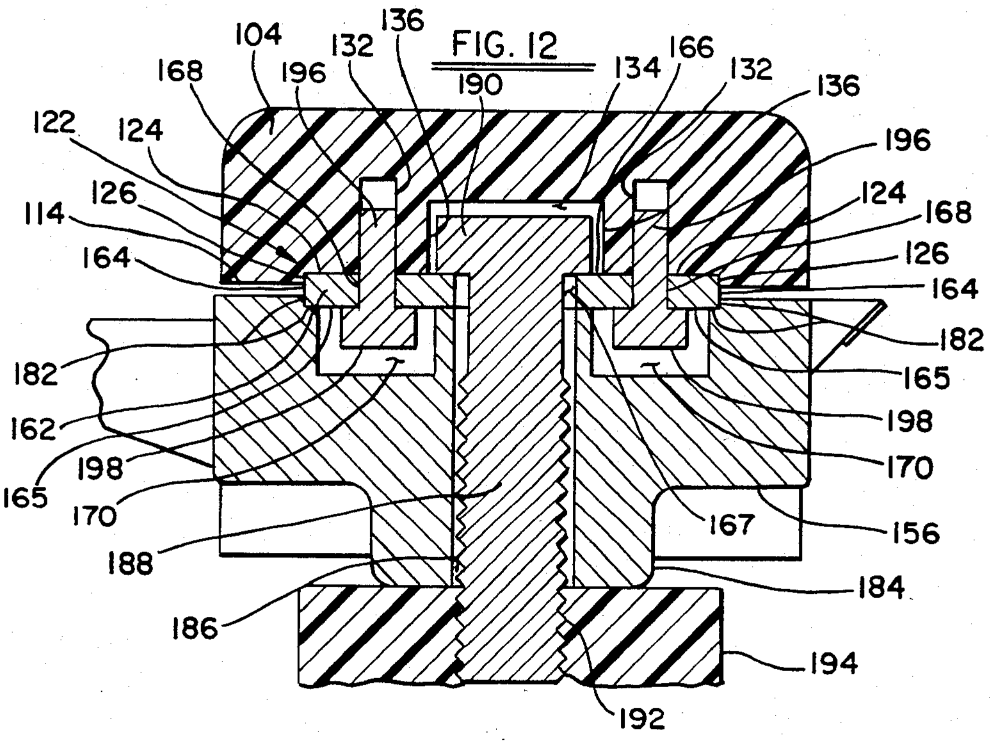
FIG. 12 is an enlarged sectional detail view taken along line 12—12 of FIG. 11.

Having described the coaction of the mounting means 102 and the pivot adjust means 24 to form a pivot saw 10, the modularity of the present system will be demonstrated as a vertical adjust saw 146 is created by the coaction of mounting means 102 and a vertical adjust subassembly or means 148 (FIGS. 11, 12, 13 and 14). Using the same one-piece field case 25 as was used in assembling the pivot adjust saw 12 previously described, the vertical adjust subassembly or means 148 for selectively adjusting the depth of cut 38 by transverse movement of the housing assembly 14 relative to reference plane 40 or worksurface is connected to the interface portion 104. The vertical adjust means 148 includes a vertical adjust shoe 150 which is connected to a vertical adjust quadrant 152 by suitable fasteners 154 (one of which is shown in FIG. 11) or by welding. As shown in FIGS. 11 and 12 vertical adjust means 148 also includes a bracket 156 connected to the quadrant 152 via a first carriage bolt 158 and knob 160, as well as a one-piece, generally rectangular rail member 162 which guides the bracket 156 for sliding movement relative to the field case 25.

The rail member 162 has an outer perimeter edge surface 164, a front face 165, and a rear face 166, and further defines an elongated bolt aperture 167. Also a plurality of fastener apertures 168 are formed in the rail member 162 in the same predetermined pattern as is formed by the interface fastener apertures 132. Again as illustrated in FIGS. 11 and 12, the bracket 156 defines two fastener clearance passages 170 running the height of the bracket 156 and being in registration with the rail member fastener aperture 168. Bracket 156 also includes sliding surfaces 182 which open into the fastener clearance passages 170. With particular reference to FIG. 12, the bracket 156 includes an integral hub 184 and a bolt through-bore 186 extending through hub 184. Bracket 156 is releasably connected to the one-piece rail member 162 by a simple square head bolt 188 having a head 190 and a threaded portion 192. Both the diameter of the bolt through-bore 186 and the width of the bolt aperture 167 are selected to allow free movement of the square head bolt 188. A vertical adjust auxiliary handle 194 threadedly engages the threaded portion 192 of the square-head bolt 188, clamping the bracket 156 to the one-piece rail member 162.

Again with reference to FIGS. 9 and 10, the assembly of the vertical adjust means 148 to the interface portion 104 of field case 25 is illustrated as follows: the head 190 of the square-head bolt 188 is placed in the interface recess 134. The one-piece rail member 162 is then placed on the interface portion 104, such that the rail member outer perimeter edge surface 164 snugly engages the second interior mounting surface 126 of the interface locating surface 122; the rail member rear face 166 engages the first interior mounting surface 124; and the threaded portion 192 of the square-head bolt 188 protrudes through the rail member bolt aperture 167. The one-piece rail member 162 is secured to the interface portion by a plurality of fasteners 196 having head portions 198, via rail member apertures 168 and interface apertures 132. The bracket-quadrant-shoe subassembly is slideably attached to the one-piece rail member 162 as previously described, with the bracket sliding surfaces 182 being guided for relatively accurate positioning by the rail member outer perimeter edge surface 164 and front face 165.

Figure 14A:
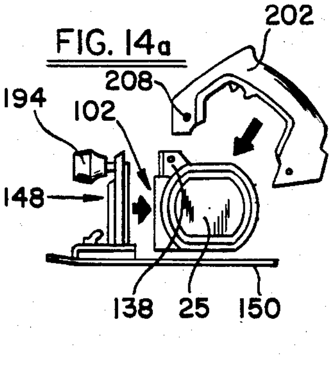
FIGS. 14*a*, 14*b* and 14*c* are schematic diagrams of the assembly and operation processes in which the same field case of FIG. 13 is also used as the foundation of a saw which varies depth of cut by transverse movement relative to a reference plane.
Figure 14B:
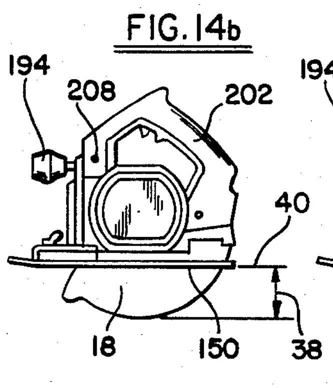
Figure 14C:
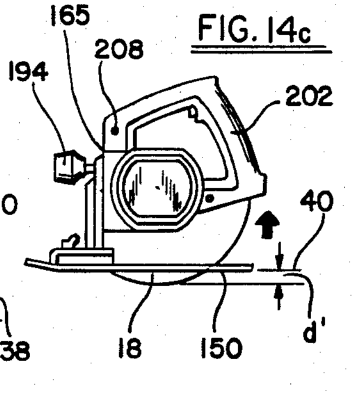

In operation, when it is desired to reduce the depth of cut 38 from that generated by the position of the elements of the vertical adjust means 148 shown in FIG. 14*b*, the vertical adjust auxiliary handle 194 is rotated to release the bracket 156 for sliding movement on rail member 162. The bracket 156 and square-head bolt 188 are then moved in unison with respect to the field case 25. Therefore the housing assembly 14, field case 25 and circular saw blade 18 move transversely with respect to reference plane 40. When the desired depth of cut d' is reached, (FIG. 14*c*) the vertical adjust auxiliary handle 194 is tightened against the hub 184 to secure the bracket 156 to the fixed rail member 162. Again as with the pivot adjust saw 12, the reference plane 40 may be the worksurface. It should be understood that although the housing assembly 14 may be rotated on the vertical adjust quadrant 152 to achieve a desired bevel angle (not shown), the depth of cut 38 is nevertheless varied by transverse movement of the housing assembly 14, as contrasted with the pivot adjust saw 12, in which the depth of cut 38 is varied by pivotal movement of the housing assembly 14.

It is now apparent that by comparing FIG. 10 with FIG. 12, the single mounting means 102 serves as a foundation for assembling two quite different types of saws. Also by comparing FIG. 13*a* with FIG. 14*a*, it can be seen that the field case 25 provides a relatively inexpensive means for converting a saw having an existing type of depth adjustment system to one having another type of depth adjusting system. For example, as shown in FIG. 13*a*, the pivot adjust means 24 may be connected to mounting means 102 in lieu of the existing vertical adjust means, 148 whereby the depth of cut of the retrofitted saw may then be adjusted by pivotal movement of the housing 14 relative to reterence plane 40, rather than by transverse movement (as was originally the case, FIGS. 14*b* and 14*c*). It should be noted that the reverse is also true (FIG. 14*a*). This result is achieved because the locating surface 122 interchangeably and positively aligns elements of both the respective depth adjust means.

Yet another aspect of the modularity of this system is illustrated in FIGS. 13*a*, 14*a* and 15. The main handle 16 can have more than one configuration. Although the main handle 16 for a pivot adjust saw is usually a "push handle" type 200 (FIGS. 13), and that for a vertical adjust saw is usually a "top handle" type 202 (FIGS. 14), at least four different types of saws may be generated from only a few different modular components. Each main handle 16 includes a hollow front portion 204 and a hollow rear portion 206, and each front portion 204 in turn defines a main handle orifice 208. As shown in FIG. 15, either handle 200,202 may be slipped onto the one-piece field case 25, with its respective front portion 204 covering the cupola 138, such that its main handle orifice 208 is in registration with the cupola main handle fastener aperture 140. The rear portion 206 is similarly placed over a projection 210 integrally formed on the field case 25. Then, as illustrated in FIG. 1, fasteners 27 secure the handles 200 or 202 to the field case 25. The result is a modular housing system which provides maximum flexibility in assembling a portable circular saw while using a minimum of variation in components.

It will be understood that various changes in the details, materials, arrangements of parts and operating conditions which have been herein described and illustrated in order to explain the nature of the invention may be made by those skilled in the art within the principles and scope of the invention.

What is claimed is:

1. A portable circular saw, comprising:

(a) a housing;

(b) a motor mounted in said housing;

(c) a circular saw blade rotatably connected to said motor;

(d) said saw blade extending a predetermined distance from a reference plane to deliver a predetermined depth of cut;

(e) mounting means on said housing for interchangeably mounting either vertical adjust means for adjusting said depth of cut by transverse movement of said housing relative to said reference plane, or pivot adjust means for adjusting said depth of cut by pivotal movement of said housing relative to said reference plane;

(f) said reference plane being defined by a saw shoe;

(g) said mounting means including an interface portion formed on said housing;

(h) said interface portion defining a locating surface, a recess formed in said housing adjacent said locating surface, and a main handle support portion;

(i) a main handle detachably connected to said housing and engaging said main handle support portion;

(j) a cupola formed adjacent said main handle support portion and defining a main handle fastener aperture;

(k) said main handle having a hollow front portion defining a main handle orifice;

(l) said hollow front portion engaging said cupola with said main handle orifice being in registration with said main handle fastener aperture; and (m) a fastener connecting said handle to said housing via said aperture and said orifice.

2. The portable circular saw of claim 1, wherein said housing and said auxiliary housing member are molded of plastic.

3. The portable circular saw of claim 1, wherein said vertical adjust means comprises a bracket slidably mounted on a one-piece rail member connected to said interface portion.

4. The portable circular saw of claim 3, wherein said one-piece rail member has a generally rectangular configuration and defines an aperture in registration with said recess.

5. The portable circular saw of claim 3, wherein:

said rail member includes a plurality of fastener apertures; and further comprising a plurality of fasteners connecting said rail member to said interface portion.

6. The portable circular saw of claim 3, wherein:

said one-piece rail member has an outer perimeter edge surface engaging said locating surface of said interface portion; and said bracket slideably engages, and is guided for transverse movement relative to said reference plane by, said outer perimeter edge surface.

* * * * *